Oct. 9, 1951     H. F. SHOEMAKER     2,570,603

TANK CLEANER

Filed Feb. 25, 1947

*INVENTOR.*
HARRY F. SHOEMAKER

BY C. M. McKnight

Patented Oct. 9, 1951

2,570,603

UNITED STATES PATENT OFFICE 2,570,603

TANK CLEANER

Harry F. Shoemaker, Tulsa, Okla.

Application February 25, 1947, Serial No. 730,729

2 Claims. (Cl. 210—206)

This invention relates to tank cleaners and more particularly but not by way of limitation to a tank cleaner adapted to remove sediment or sludge collected at the bottom of a tank.

In the oil industry, particularly around production areas, tank farms are provided which include numerous tanks for receiving the oil being produced. The flow of the oil into and out of the tanks leaves a deposit therein which is commonly known as bottom sediment or sludge. This sludge builds up in the bottom of the tank so that it is necessary at various intervals to clean the tank and remove the sludge through proper drain holes in the side of the tank. The cleaning of the tank by present day method involves considerable delays, inconveniences and danger of an explosion due to the collection of gases therein, or if a man must go into the tank, the danger of slipping and falling in manual cleaning is prevalent.

The present invention obviates these objections in providing a novel blade member disposed adjacent the bottom of the tank and rotated therein in such a way to effect a plowing action against the collected sludge wherein a progressive removal can be made from the tank.

It is an object of the present invention to provide a tank cleaner wherein the collected sediment or sludge therein can be removed from the tank without the necessity of an operator entering the tank at any time.

A further object of this invention is to provide a tank cleaner of such construction that it will have substantially universal application to any conventional storage tank utilized in the oil industry for the storage of oil and the like.

And still another object of this invention is to provide a tank cleaner of such construction that the bottom sediment collected in the tank is progressively moved through a plowing action to be discharged through outlets in the tank and effect an efficient and positive action which is simple and inexpensive to manufacture, durable in use, and easy to maintain.

Other objects and advantages of the invention will be evident from the following detailed description, read in conjunction with the accompanying drawings, which illustrate my invention.

In the drawings

Figure 1:
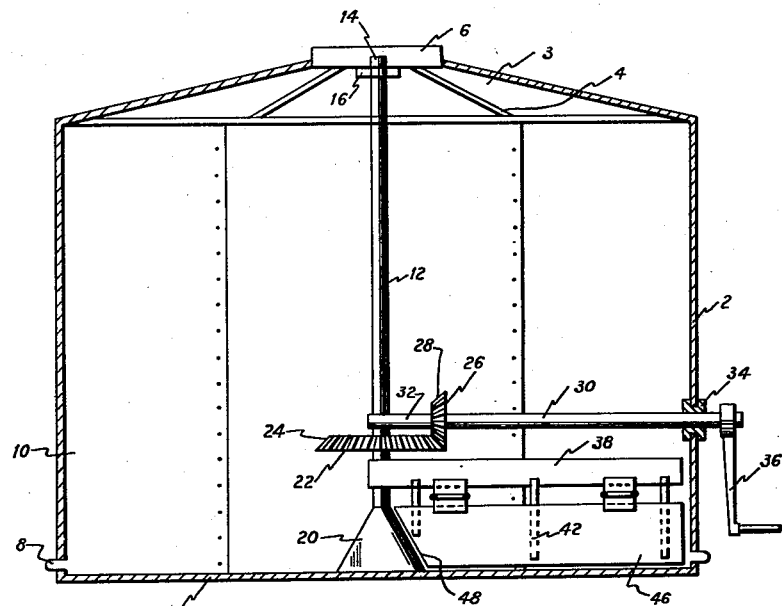
Figure 1 is a sectional elevation of a tank showing the preferred form of the tank cleaner disposed therein.
Figure 3:
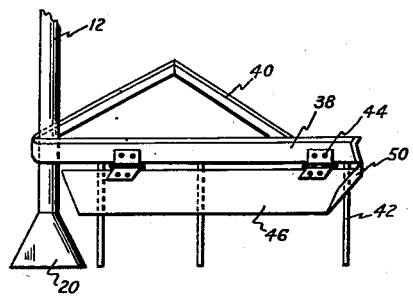
Figure 3 is a detail view in elevation showing the spade of the tank cleaner in open position.

Referring to the drawings in detail and particularly Figures 1 and 3, reference character 2 discloses an upright vertical tank commonly used as a storage tank on tank farms in the oil industry. The tank is provided with the usual dome 3 having braces 4 and a manhole member 6. A plurality of circumferentially spaced outlet apertures 8 are provided in the side wall 10 of the tank and are preferably plugged (not shown) for a purpose as will be hereinafter set forth.

The tank cleaner comprises an upstanding circular drive shaft 12 adapted to be anchored at the top portion 14 in the manhole 6 by a collar or bearing 16. The bottom end of the shaft 12 is anchored against the base 18 of the tank in any conventional means such as a journal, or bearing (not shown). Furthermore, the lowermost end of the shaft 12 is provided with a cone member 20 for a purpose as will be hereinafter set forth. A circular gear 22 having teeth 24 is secured to the shaft 12 and cooperates with a smaller pinion or gear 26 having teeth 28. The gear 22 is mounted on a freely rotatable horizontally disposed shaft 30 journaled at one end in a bearing 32 adjustably secured to the shaft 12 in any conventional manner (not shown). The opposite end of the shaft 30 extends through a collar or bearing 34 secured in an apertured portion of the tank wall 10. A handle member 36 is secured to the end of the shaft in order to provide means for causing rotation of the freely rotatable shaft 30.

At a point below the gear 22 a sweep arm 38 is adjustably secured to the shaft 12 in any convenient manner such as a set screw or the like (not shown) and extends outwardly from the shaft 12 to be disposed transversely in the tank 2. The sweep or plow arm 38, as noted in Figure 3, is preferably provided with bracing members 40 in order to provide rigidity. A plurality (preferably 3) of horizontally spaced rods or pins 42 are secured to the back side of the sweep arm 38 for a purpose as will be hereinafter set forth. A pair of spaced hinges 44 are secured to the front face of the sweep arm 38, and are connected with a swinging plate or blade 46. From Figures 1 and 3 it will be noted that one end of the swinging plate 46 is provided with an angled portion 48 while the opposite end has an upstanding flange portion 50.

Operation

In operation the tank cleaning unit is disposed in the tank as shown in Figure 1. It will be apparent that the tank unit can be operated in a storage tank for cleaning the bottom sediment or sludge irrespective of whether lighter oil disposed above the oil is present in the tank. However, for a more efficient cleaning the storage tank is usually emptied of the lighter oils in order to efficiently clean the sediment remaining adjacent the bottom thereof. With the cleaner unit in the tank, the freely swinging blade 46 rests on top of the sludge in open position, as shown in Figure 3, and rotation of the gear 22 in one direction may be made to cause a backward movement of the sweep arm 38 and the blade 46 to a point in the sediment desired to be removed. At this point, rotation of the gear in the opposite direction by the shaft 30 and handle 36 provides a reverse or forward movement of the sweep arm 38 and the blade 46, whereupon the sweep arm will have a plowing action into the soft sludge or sediment, and will continue this plowing action until the blade 46 is disposed in a substantially vertical upright position, as shown in Figure 1, whereupon continued forward movement of the sweep arm plate 46 will move the sediment around the tank for discharge through an unplugged aperture 8. It will be apparent that the upstanding pins 42 limit the movement of the sweep arm in one direction during the plowing action so that the sweep arm may be maintained in a vertical position during the movement of the sludge to a point of outlet.

It will be apparent that this may be a repetitious operation in order to progressively remove the sediment from the complete bottom of the tank, thereby effecting a cleaning of the tank. The angular end portion 48 cooperates with the outer periphery of the cone member 20 in order to provide an expeditious opening of the sweep arm 46 on the back stroke. Any conventional type backing plate (not shown) is usually disposed in the tank transversely of the radius thereof, and at a point adjacent the outlet aperature 8 in order to assure that the sludge moved by the sweep arm 46 is directed through the outlet. In the progressive removal of the sediment it will be apparent that during the back stroke the sweep arm 46 must be raised to an open position, as shown in Figure 3, and the cone 20 cooperating with the angled portion 48 to facilitate movement of the sweep arm from a vertical to a horizontal position, or vice versa particularly when disposed in proximity of the backing plate (not shown). Furthermore, the flange portion 50 assists in preventing spilling of the sludge over the sweep arm 46 at one end of the blade normally adjacent the inner periphery of the tank wall. After the tank has been cleaned of bottom sediment or sludge it will be apparent that new oil may be run in from any desired inlet (not shown) and the tank is ready for operation again.

Figure 2:
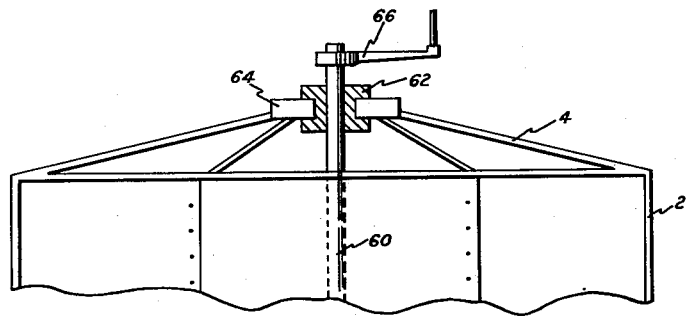
Figure 2 is a fragmentary sectional elevation view showing a modified form of the actuating means for the tank cleaner.

Figure 2 shows a modification of the actuating means wherein the gears 24 and 26 and rotatable shaft 30 are eliminated. In this figure the upright shaft 60 is loosely journaled in a bearing 62 provided in the manhole 64. A handle 66 is secured to the outer end of the shaft. The lower end of the shaft is journaled to the bottom of the tank (not shown) in any conventional manner. The tank cleaning element comprising the sweep arm and swinging blade is fixed to the shaft (not shown) in a manner exactly with that of the preferred embodiment. It will be apparent that the handle 66 may be turned to cause rotation of the shaft in either direction to cause operation of the sweep arm in a manner substantially as that described for the preferred embodiment.

From the foregoing it will be apparent that the present invention provides a novel and efficient means for cleaning collected sediment or sludge from the bottom of a tank in that the sludge is progressively moved to outlet apertures in the tank, and the progressive movement is effected by a plowing action of the sweep arm and plate member. Furthermore, the sweep arm is responsive to variable rotations of the supporting shaft to cause the swingable plate member to be positioned above the sludge in one direction of rotation and then effect a plowing action into the sludge for removal by an opposite direction of rotation.

Changes may be made in the specifications and drawings without departing from the spirit of the invention within the scope of the following claims, as set forth.

What I claim is:

1. In an apparatus for cleaning bottom sediment from tanks comprising a rotatable shaft provided therein, a plate support member adjustably secured to the shaft and disposed laterally therefrom at a point substantially adjacent the bottom of the tank, a hinged plate member secured to the arm for swinging upwardly to a position above the bottom sediment upon contact therewith and then swing downwardly to effect a plowing action thereinto, one end of said plate member of angular configuration, a cone like base member on the shaft, said angular end disposed adjacent to the outer periphery of the cone member to facilitate the swinging movement of the plate member at a point in proximity of the outlet.

2. In an apparatus for cleaning sludge from tanks comprising a rotatable shaft provided therein, a plate support member adjustably secured to the shaft and disposed laterally therefrom at a point substantially adjacent the bottom of the tank, plate means movably secured to the support member for swinging upwardly above the sludge upon contact therewith, and then downwardly to effect a plowing action thereinto for moving the sludge in the tank, outlet means in the tank for the sludge moved by the first mentioned means, means extending outside the tank to effect rotation of the shaft, and a plurality of transversely spaced rod members cooperating with the plate support for limiting the swinging movement of the plate in one direction during the plowing action.

HARRY F. SHOEMAKER.

REFERENCES CITED

The following references are of record in the file of this patent:

UNITED STATES PATENTS

| Number | Name | Date |
|---|---|---|
| 819,803 | Rickerd | May 8, 1906 |
| 1,736,842 | Wilcox | Nov. 26, 1929 |
| 1,986,573 | Hardinge | Jan. 1, 1935 |
| 2,067,105 | Stevens et al. | Jan. 5, 1937 |
| 2,067,277 | Miick | Jan. 12, 1937 |
| 2,169,442 | Wuensch | Aug. 15, 1939 |

FOREIGN PATENTS

| Number | Country | Date |
|---|---|---|
| 334,851 | Great Britain | Sept. 10, 1930 |
| 530,304 | France | Sept. 29, 1921 |